United States Patent Office 2,812,335
Patented Nov. 5, 1957

2,812,335

BENZOQUINONE ADDUCTS OF $\Delta^{5,16,20}$ AND $\Delta^{3,5,16,20}$ DIOXYGENATED STEROIDS Robert H. Mazur, Evanston, Ill., assignor, by mesne assignments, to G. D. Searle & Co., Skokie, Ill., a corporation of Delaware No Drawing. Application February 16, 1955, Serial No. 488,711

9 Claims. (Cl. 260—397.4)

This invention relates to dialkanoyloxypolyhydrodimethylbenzo[a]naphtho[1,2-i]fluorenediones and processes for the manufacture thereof. More particularly, this invention relates to compounds of the formula

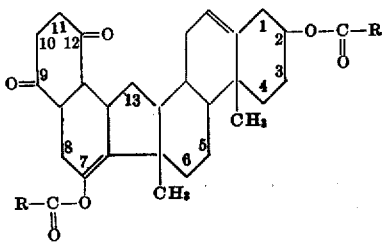

wherein R is a lower alkyl radical, and to compounds otherwise identical therewith wherein there is a double bond at one or each of the positions 1(2) and 10(11).

The compounds of this invention possess valuable physiological properties. Especially, the subject compounds are useful because of their selective anti-cortisone activity. Administered conjointly with cortisone, they block the atrophying influence thereof on the lymph nodes, prevent the deposition of glycogen in the liver, and inhibit in particular species cortisone-induced susceptibility to disease, without, however, impairing the curative effects of this widely used medicament. Additionally, the compounds here disclosed manifest desirable anti-hypertensive properties, resembling, in this respect, Rauwolfia serpentina, a hypotensive agent of established reputation.

The compounds of the present discovery are relatively insoluble in water but may for the most part be dissolved in benzene, dioxane, and similar non-polar organic solvents. One exception to this solubility pattern is found in Example 2 hereinafter, where the compound derived by alkaline treatment of the primary product there obtained may be dissolved in chloroform but is insoluble in both benzene and dioxane. The claimed compounds may be administered in solid form as tablets or capsules; as microcrystalline suspensions in aqueous media, they may be given parenterally.

The compounds to which this invention relates are prepared by contacting an appropriately unsaturated steroid ester of the formula

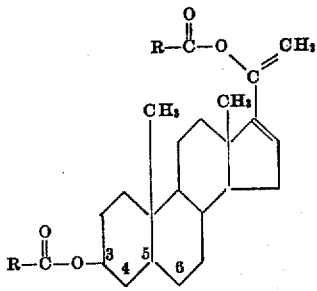

wherein R is defined as above and there is a double bond appearing at one or each of the positions 3(4) and 5(6), with benzoquinone according to accepted Diels-Alder techniques, using an inert solvent such as benzene if desired. Moderate auxiliary heating serves in most instances to shorten the reaction time. The $\Delta^{10}$-benzonaphthofluorenediones of this invention thus obtained are converted to the corresponding 10,11-dihydro compounds hereof by standard reductive procedures, as for example by treatment with zinc dust and acetic acid at moderate temperatures.

The following examples will illustrate in detail certain of the adducts which constitute the present invention and methods which have been devised for their preparation. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade (° C.) and relative amounts of materials in parts by weight, except as otherwise noted. Specific rotations refer to the D line of sodium, readings being taken at room temperatures.

EXAMPLE 1

2,7 - diacetoxy - 1,2,3,4,4a,4b,5,6,6a,8,8a,9,12,12a,12b, 13a,13b,14 - octadecahydro - 4a,6a - dimethyl - 13H-benzo-[a]naphtho[1,2-i]fluorene-9,12-dione.—A solution of 78 parts of 3,20-diacetoxypregna-5,16,20-triene—preparable by the method of Moffett and Weisblat, J. Amer. Chem. Soc., 74, 2183 (1952)—and 39 parts of benzoquinone in 88 parts of anhydrous benzene is warmed to initiate reaction, following which the solution is intermittently cooled as necessary to control the amount of heat evolved and, finally, allowed to stand overnight at room temperatures. The solution is then heated to reflux and diluted with 390 parts of boiling cyclohexane, whereafter, on cooling, the desired 2,7-diacetoxy-1,2,3, 4,4a,4b,5,6,6a,8,8a,9,12,12a,12b,13a,13b,14 - octadecahydro - 4a,6a - dimethyl - 13H - benzo[a]naphtho[1,2-i]-fluorene-9,12-dione comes down as clusters of small needles which, again crystallized from a mixture of benzene and cyclohexane show M. P. approximately 226° C. The specific rotation in dioxane solution is +89°. The product has the formula

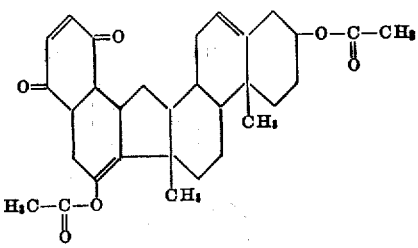

EXAMPLE 2

2,7 - diacetoxy-1,2,3,4,4a,4b,5,6,6a,8,8a,9,10,11,12,12a,-12b,13a,13b,14 - eicosahydro - 4a,6a - dimethyl - 13H-benzo[a]naphtho[1,2-i]fluorene-9,12-dione.—To a solution of 12 parts of the adduct of the preceding Example 1 in 380 parts of glacial acetic acid at 100° C. is added with agitation over a 10-minute period 60 parts of zinc dust. Heating at 100° C. with agitation is continued for 1 hour, following which the mixture is filtered and the precipitate washed on the filter with glacial acetic acid. The combined filtrates are distilled under reduced pressure to about one-half the volume of the original reaction mixture, at which point an equal weight of water is introduced and the product so precipitated removed by filtration. Crystallization is effected by dissolving the product in 5 parts of benzene, diluting with 25 parts of ethyl alcohol, and concentrating the resultant solution to one-half volume. The 2,7 - diacetoxy - 1,2,3,4,4a,-4b,5,6,6a,8,8a,9,10,11,12,12a,12b,13a,13b,14-eicosahydro-4a,6a - dimethyl - 13H - benzo[a]naphtho[1,2-i]fluorene-9,12 - dione precipitates as tiny plates, M. P. 244–247° C., specific rotation in dioxane solution being —50°. The product has the formula

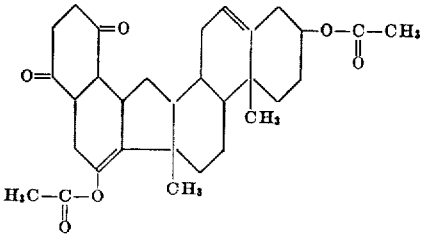

Under mildly alkaline conditions, the foregoing dihydro adduct is subject to epimerization. Thus, a solution of 12 parts of the adduct in 210 parts of benzene, to which is added to mixture of 12 parts of potassium carbonate and 425 parts of ethyl alcohol followed cautiously and with vigorous agitation by 6 parts of water affords, after half an hour's continued agitation, a precipitate which, washed with ethyl alcohol and triturated with water to remove potassium carbonate, crystallizes from 10 parts of chloroform and 70 parts of glacial acetic acid—upon concentration of the resultant solution volume by one-third—as needles, M. P. 316–319° C., specific rotation —103° (in dioxane).

EXAMPLE 3

(A) *3,20 - diacetoxypregna - 3,5,16,20 - tetraene.*—A solution of 20 parts of pregna-4,16-diene-3,20-dione and 2 parts of p-toluenesulfonic acid monohydrate in 460 parts of isopropenyl acetate is heated to reflux temperatures while acetone formed in process is allowed to distill off. After 7 hours, distillation is interrupted and an additional 2 parts of p-toluenesulfonic acid monohydrate and 230 parts of isopropenyl acetate is added. The solution is distilled nearly to dryness, whereupon the residue is taken up in benzene. The benzene solution is washed with aqueous sodium bicarbonate and then water, following which it is dried over anhydrous sodium sulfate and finally stripped of solvent in vacuo. The residue, crystallized from methyl alcohol and recrystallized from a mixture of benzene and cyclohexane, gives long needles of 3,20-diacetoxypregna-3,5,16,20-tetraene, M. P. 125–128° C. The product has the formula

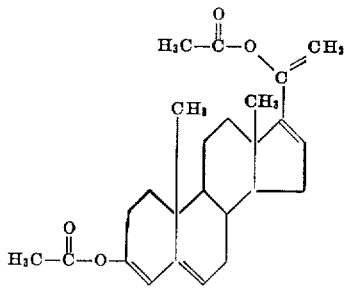

(B) *2,7 - diacetoxy - 3,4,4a,4b,5,6,6a,8,8a,9,12,12a, 12b,13a,13b,14 - hexadecahydro - 4a,6a-dimethyl-13H-benzo[a]naphtho[1,2-i]fluorene-9,12-dione.* — A mixture of 17 parts of the 3,20-diacetoxypregna-3,5,16,20-tetraene of the preceding part A of this example and 34 parts of benzoquinone is dissolved in 26 parts of hot benzene. The solution is allowed to stand at room temperatures overnight, following which solvent and excess benzoquinone are removed by distillation under reduced pressure, and the residue is recrystallized from a mixture of benzene and cyclo hexane, and then from ethyl alcohol, yielding prismatic needles, M. P. 188–190° C. The 2,7-diacetoxy - 3,4,4a,4b,5,6,6a,8,8a,9,12,12a,12b,13a,13b,14-hexadecahydro - 4a, 6a - dimethyl - 13H - benzo[a]naph-tho[1,2-i]fluorene-9,12-dione thus obtained shows a specific rotation of 0° in dioxane and has the formula

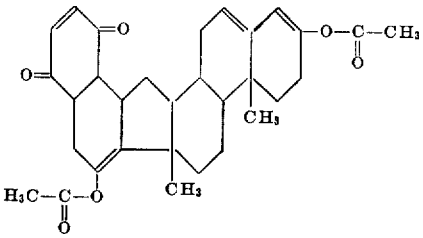

EXAMPLE 4

*2,7 - diacetoxy - 3,4,4a,4b,5,6,6a,8,8a,9,10,11,12,12a, 12b,13a,13b,14 - octadecahydro - 4a,6a - dimethyl - 13H-benzo[a]naphtho[1,2 - i]fluorene - 9,12 - dione.*—A solution of 2 parts of the adduct of the preceding Example 4 in 500 parts of glacial acetic acid is heated with agitation at 100° C. while 50 parts of zinc dust is added portionwise over half an hour. The reaction mixture is then filtered, solids are washed with acetic acid, the combined filtrates are concentrated to about 350 parts by weight, and the concentrate is diluted with an equal quantity of water, so precipitating the desired 2,7 - diacetoxy - 3,4,-4a,4b,5,6,6a,8,8a,9,10,11,12,12a,12b, 13a, 13b, 14 - octadecahydro - 4a,6a - dimethyl - 13H - benzo[a]naphtho-[1,2-i]fluorene-9,12-dione, which is removed by filtration. Crystallization from a mixture of benzene and ethyl alcohol yields long, thin prisms, M. P. 234-239° C., the specific rotation of which in chloroform solution is —126°. The product has the formula

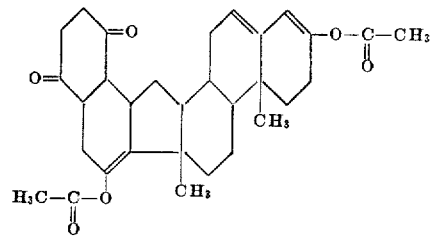

What is claimed is:
1. A compound of the formula

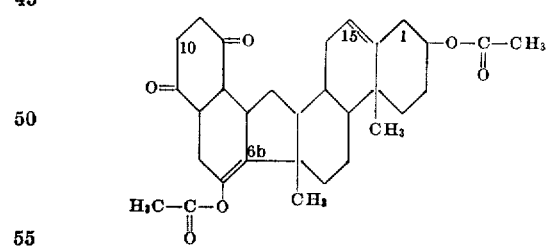

wherein at least 2 and as many as all of the carbons at positions 1, 6b, 10, and 15 are doubly bonded to the carbons next numerically succeeding in each instance.

2. 2,7 - diacetoxy - 1,2,3,4,4a,4b,5,6,6a,8,8a,9,12,12a, 12b,13a,13b,14 - octadecahydro - 4a,6a - dimethyl - 13H-benzo[a]naphtho[1,2-i]fluorene-9,12-dione.

3. 2,7 - diacetoxy - 1,2,3,4,4a,4b,5,6,6a,8,8a,9,10,11,12, 12a,12b,13a,13b,14 - eicosahydro - 4a,6a - dimethyl - 13H-benzo[a]naphtho[1,2-i]fluorene-9,12-dione.

4. 2,7 - diacetoxy - 3,4,4a,4b,5,6,6a,8,8a,9,10,11,12, 12a,12b,13a,13b,14 - octadecahydro - 4a,6a - dimethyl-13H-benzo[a]naphtho[1,2-i]fluorene-9,12-dione.

5. 2,7 - diacetoxy - 1,2,3,4,4a,4b,5,6,6a,8,8a,9,10,11,12, 12a,12b,13a,13b,14 - eicosahydro - 4a,6a - dimethyl-13H-benzo[a]naphtho[1,2-i]fluorene-9,12-dione, melting at 244–247° C. and having a specific rotation of —50° in dioxane solution.

6. 2,7 - diacetoxy - 1,2,3,4,4a,4b,5,6,6a,8,8a,9,10,11,12, 12a,12b,13a,13b,14 - eicosahydro - 4a,6a - dimethyl - 13H-benzo[a]naphtho[1,2-i]fluorene-9,12-dione, melting at 316–319° C. and having a specific rotation of —103° in dioxane solution.

7. 2,7 - diacetoxy - 3,4,4a,4b,5,6,6a,8,8a,9,12,12a,12b, 13a,13b,14 - hexadecahydro - 4a,6a - dimethyl - 13H-benzo[a]naphtho[1,2-i]fluorene-9,12-dione.

8. In a process for preparing compounds of the formula

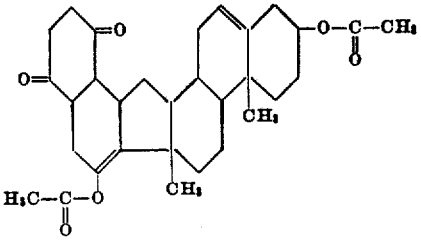

wherein at least 2 and as many as all of the carbons at positions 1, 6b, 10, and 15 are doubly bonded to the carbons next numerically succeeding in each instance, the step which comprises contacting a steroid of the formula

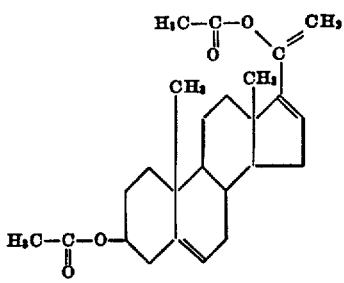

wherein at least 3 and as many as all of the carbons at positions 3, 5, 16, and 20 are doubly bonded to the carbons next numerically succeeding in each instance, with benzoquinone.

9. In a process for preparing compounds of the formula

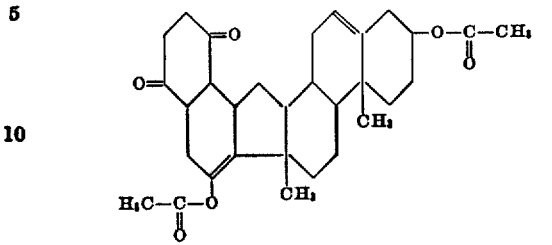

wherein at least 2 and as many as all of the carbons at positions 1, 6b, 10, and 15 are doubly bonded to the carbons next numerically succeeding in each instance, the step which comprises contacting a steroid of the formula

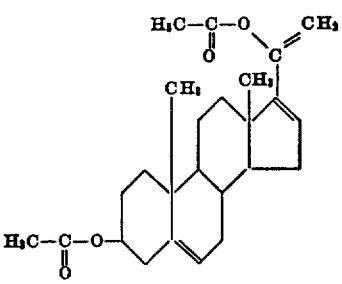

wherein at least 3 and as many as all of the carbons at positions 3, 5, 16, and 20 are doubly bonded to the carbons next numerically succeeding in each instance, with benzoquinone, using anhydrous benzene as a solvent.

No references cited.

UNITED STATES PATENT OFFICE

CERTIFICATE OF CORRECTION

Patent No. 2,812,335                                        November 5, 1957

Robert H. Mazur

It is hereby certified that error appears in the printed specification of the above numbered patent requiring correction and that the said Letters Patent should read as corrected below.

Column 3, line 22, for "to mixture" read -- a mixture --; line 72, for "cyclo hexane" read -- cyclohexane --; column 4, lines 18 and 19, for "Example 4" read -- Example 3 --.

Signed and sealed this 7th day of January 1958.

(SEAL)
Attest:

KARL H. AXLINE
Attesting Officer

ROBERT C. WATSON
                                                                          Commissioner of Patents